United States Patent [19]

Clegg

[11] Patent Number: 4,577,939
[45] Date of Patent: Mar. 25, 1986

[54] MONOCHROMATIC BEAM CONCENTRATOR

[76] Inventor: John E. Clegg, 2320 Keystone Dr., Orlando, Fla. 32806

[21] Appl. No.: 659,813

[22] Filed: Oct. 11, 1984

[51] Int. Cl.⁴ .................. G02B 13/18; G02B 17/08
[52] U.S. Cl. .................. 350/443; 126/440; 350/432; 350/433
[58] Field of Search .......... 350/443, 432, 433; 126/440

[56] References Cited

U.S. PATENT DOCUMENTS

| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |

Primary Examiner—John K. Corbin
Assistant Examiner—Rebecca D. Gass

[57] ABSTRACT

A conical beam concentrator comprising four component lenses which receive an incipient beam of sunlight and emit a concentrated beam of monochromatic light. The incipient beam is received and refracted by the upper component lens, reflected and refracted through two middle component lenses, and refracted and emitted as a concentrated monochromatic beam by the lower component lens.

1 Claim, 2 Drawing Figures

MONOCHROMATIC BEAM CONCENTRATOR

BACKGROUND

The code designation of the concentrator is 2RR-RLT-RT:CM (R—refracting section of a component lens, L—reflecting section of a component lens, T—transmitting section of a component lens, C—concentrating stage lens, and M—monochromatic).

Prior art includes the *Conical Beam Concentrator*, U.S. Pat. No. 4,333,713, 6/8/82, by this inventor. The upper component and lower component lenses of this concentrator are similar to those lenses of the subject disclosure.

DRAWINGS

DESCRIPTION

Figure 1:
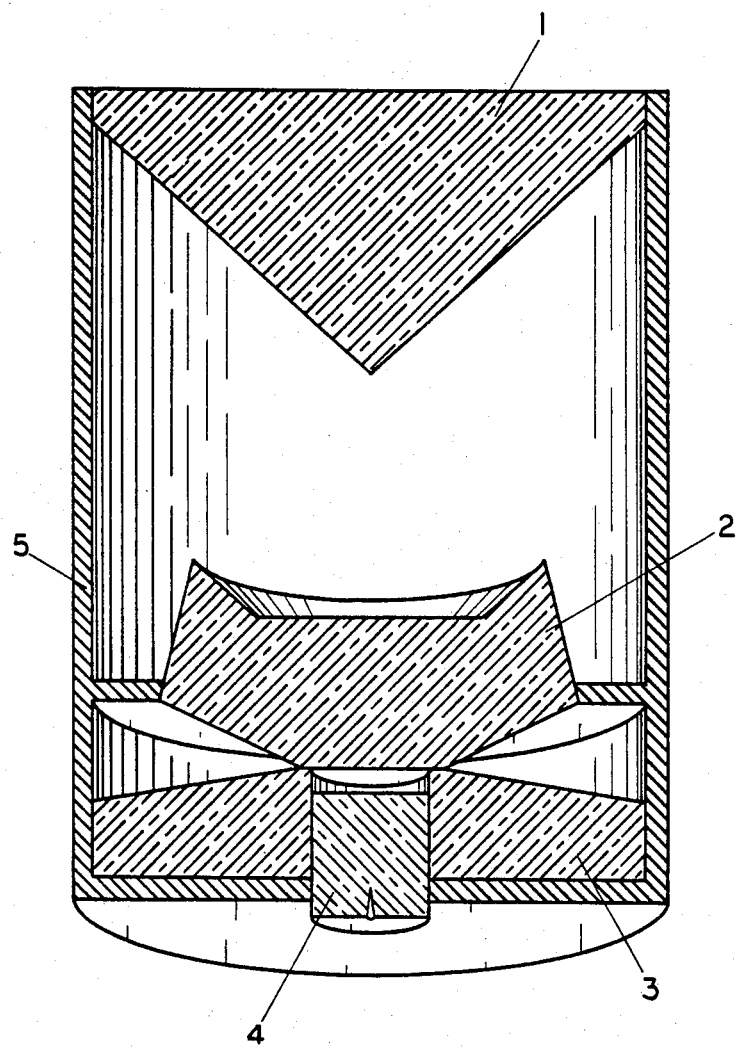
FIG. 1 is an elevation of the monochromatic beam concentrator with the lenses shown in section.

FIG. 1 shows the monochromatic beam concentrator 2RR-RLT-RT:CM with upper component lens RT 1, first middle component lens RLT 2, second middle component lens RR 3 and lower component lens RR 4 mounted inside casing 5.

Figure 2:
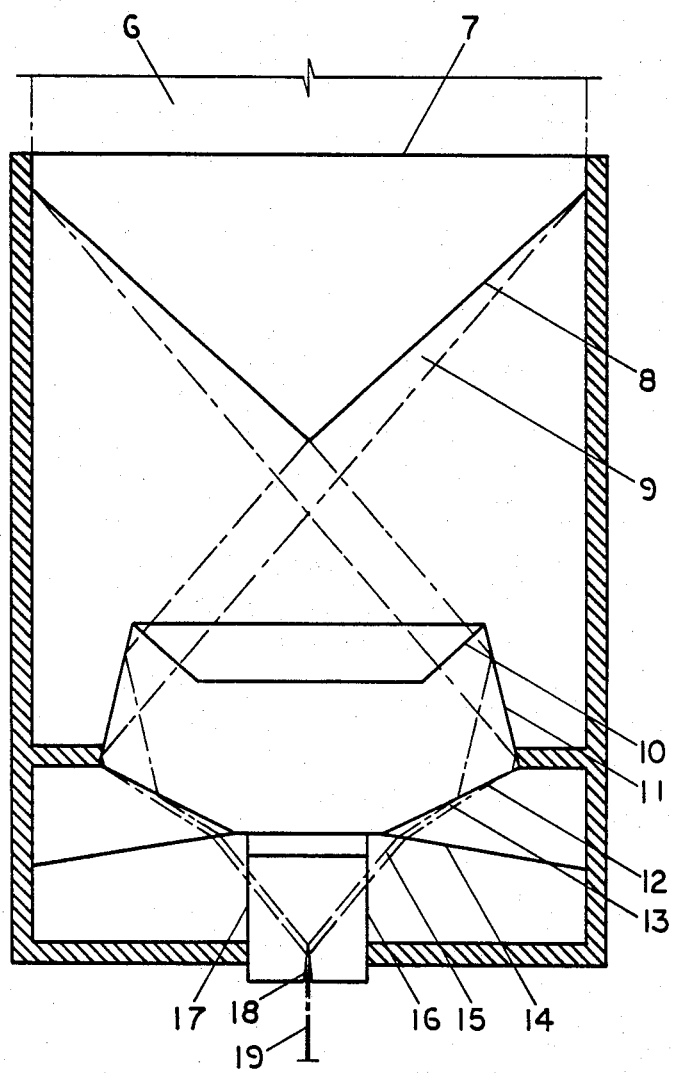
FIG. 2 is an elevation of the concentrator with a ray diagram.

FIG. 2 shows the monochromatic beam concentrator with a ray diagram. Circular whole incipient beam 6 of sunlight is received and transmitted by planar section 7 and refracted by convex conical section 8, forming convergent conical beam 9.

Beam 9 is transmitted by concave conical section 10, reflected by convex conical reflective section 11 and refracted by convex conical section 12, forming convergent conical beam 13.

Beam 13 is refracted by convex conical section 14, forming spectral beam 15 which is refracted and emitted by concave cylindrical section 16.

Spectral beam 15 is refracted by convex cylindrical section 17 and refracted by concave conical section 18, forming concentrated monochromatic whole beam 19 which is emitted parallel to the vertical optic axis of the concentrator.

Lower component lens RR 4 can be raised and lowered inside concave cylindrical section 16 of second middle component lens RR 3 so as to intercept selected portions of spectral beam 15. In practice the lower portion of concave conical section 18 will be opaque, leaving only the apex of the section exposed to spectral beam 15.

I claim:

1. A monochromatic beam concentrator 2RR-RLT-RT:CM comprising in general four component lenses which receive a circular whole incipient beam of direct sunlight and emit a concentrated circular whole beam of monochromatic light, and comprising in particular;

An upper component lens RD (1) having a planar section (7) which receives and transmits a circular whole incipient beam (6) of direct sunlight and having a convex conical section (8) which refracts said incipient beam (6), forming a convergent conical beam (9), A first middle component lens RLT (2) mounted below said upper component lens RT (1) and having a concave conical section (10) which transmits said convergent conical beam (9), and having a convex conical reflective section (11) which reflects said convergent conical beam (9), and having a convex conical section (12) which refracts said convergent conical beam (9), forming a convergent conical beam (13), A second middle component lens RR (3) mounted below said first middle component lens RLT (2) and having a convex conical section (14) which refracts said convergent conical beam (13), forming spectral beam (15), and having a concave cylindrical section (16) which refracts and emits said spectral beam (15), and A lower component lens RR (4) mounted below said second middle component lens RR (3) and having a convex cylindrical section (17) which refracts said spectral beam (15), and having a concave conical section (18) which refracts said spectral beam (15), forming a concentrated monochromatic circular whole beam (19) which is emitted parallel to the vertical optic axis of the lenses.

* * * * *